UNITED STATES PATENT OFFICE.

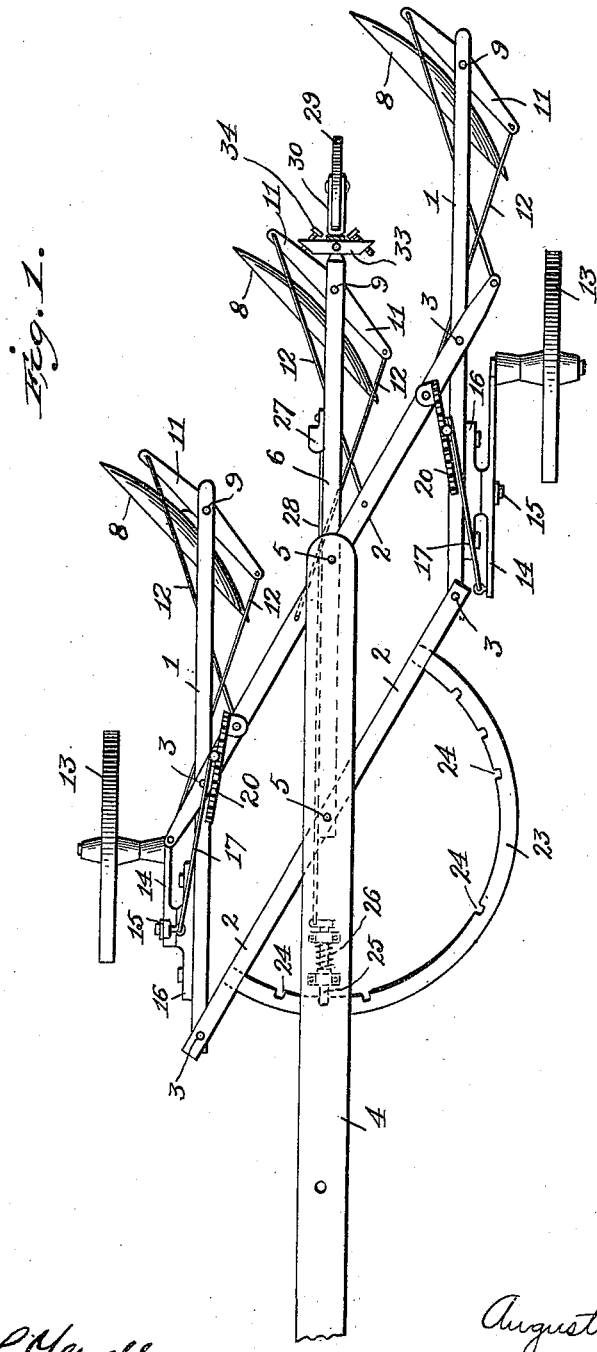

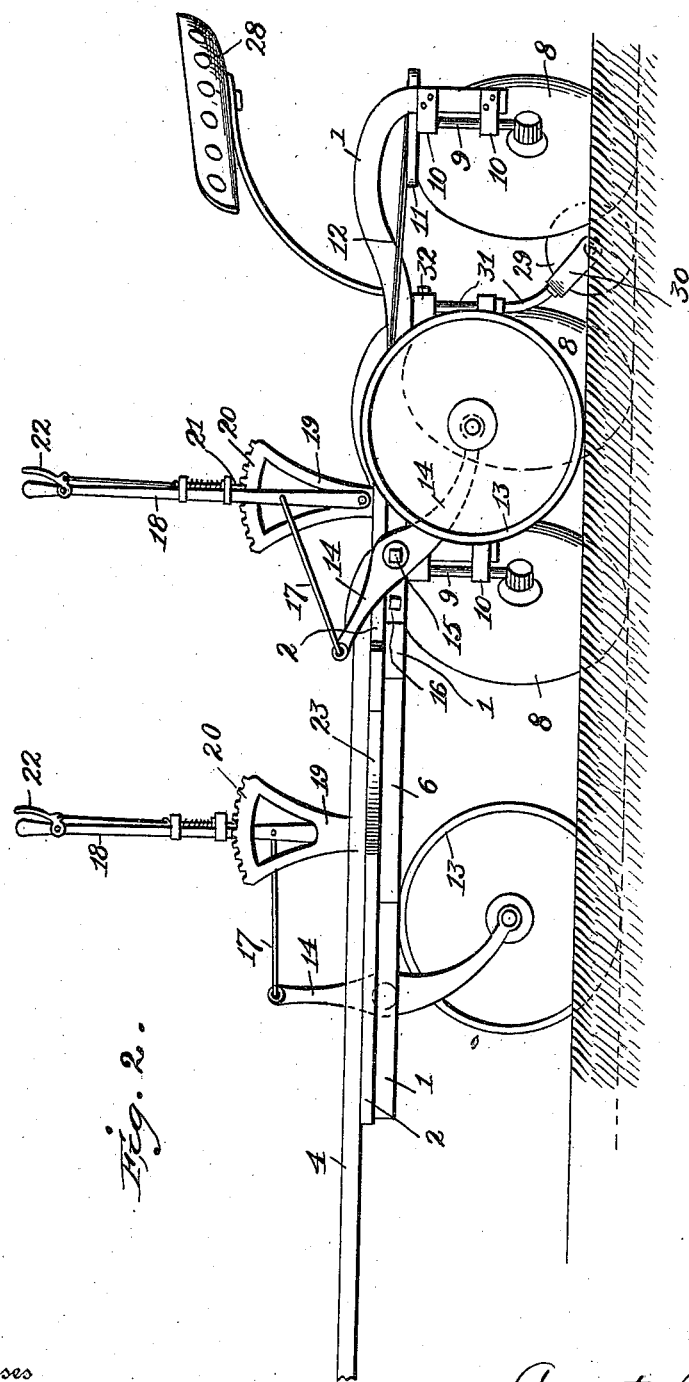

AUGUSTA P. McKAY, OF SHEFFIELD, ALABAMA.

REVERSIBLE DISK PLOW.

987,477. Specification of Letters Patent. Patented Mar. 21, 1911.

Application filed April 11, 1910. Serial No. 554,843.

*To all whom it may concern:*

Be it known that I, AUGUSTA P. McKAY, a citizen of the United States, residing at Sheffield, Colbert county, Alabama, have invented certain new and useful Improvements in Reversible Disk Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in disk plows and has for its object to provide a plow in which a change of the relative positions of the plow beams will automatically and simultaneously change the position of the plow disks with relation to the beams, and simultaneously and automatically change the level of the supporting wheels.

The invention consists of a plurality of parallel plow beams pivotally connected to parallel cross beams, each plow beam having a rotatable plow disk pivoted in its rear end, said disks being connected with the cross beam by means capable of imparting a rotary movement to the pivots, and wheels for supporting the plow beams so connected with the cross beams that a raising and lowering of the wheels is effected by the movement of the cross beams.

The invention further consists in details of construction and arrangement of parts as hereinafter fully described; illustrated in the drawings and pointed out in the claims.

In the accompanying drawings—Figure 1 is a plan view of a disk plow embodying the features of my invention, the parts being in operative position. Fig. 2 is a side elevation of the same.

The plow consists of two side beams, as 1, which are held in parallel relation by means of two parallel cross beams 2, which are pivotally connected to the front and central portion of the beams by means of bolts 3, and these cross beams are centrally pivoted on the underside of a draft pole or tongue 4 by means of bolts 5, which latter pass through a central plow beam 6 of the same construction as the side beams. The pole 4 is to be provided in the usual manner with the well-known double-tree, not shown.

While I have only shown three beams, any number may be employed provided the cross bars 2 are made sufficiently long to permit the beams to be spaced far enough apart to allow the plow disks, hereinafter described, to stand at right angles to the beams without touching each other.

Each plow beam is provided at its rear end with a disk 8, which is journaled in the lower end of a shank 9 which passes through and is journaled in bearing-blocks 10 fixed to a vertical part of the beam. On the upper end of each shank 9 is fixed a cross-bar 11, which is connected with the rear cross-beam 2 by means of rods 12 which are pivotally connected to each end of the cross bar. These rods 12 cross each other and are pivotally connected with the rear cross-beam on opposite sides of the point where the plow beam is connected to the cross-beam, and the rear cross beam extends over the two side beams for the purpose of forming a connecting point for two of the rods.

The front end of each side beam is supported by a wheel 13 which is journaled on one end of a two-armed lever 14 centrally pivoted on a stub-shaft 15 projecting from a cleat 16 bolted to the outside of the plow beam. The free end of each lever 14 is connected by means of a rod 17 with a hand-operated lever 18 which is fulcrumed at the lower end on a bracket 19, which is pivoted on the rear cross-beam 2, inside the side beam 1. The bracket 19 has a segmental rack 20 which is engaged by a spring-actuated pawl 21 carried by the lever 18 and operated in a well-known manner by a handle 22.

Fixed to and projecting in front of the front cross-beam 2 is a semi-circular bar 23 provided with a series of notches 24 in its inner edge, and mounted on the underside of the tongue 4 is a bolt 25 which is normally held projected by a spring 26 against the bar 23, so as to engage the notches and lock the bar. The bolt is retracted against the action of its spring to release the bar by means of a foot lever 27, which is connected with the bolt by a wire or chain 28, said foot lever being pivoted on the central plow beam 6 within convenient reach of the foot of the operator, for whom a seat, as 28, is also fixed to said beam, as shown in Fig. 2.

In rear of the central plow disk I mount a guide disk 29, for the purpose of resisting the lateral thrust of the plow disks. This disk 29 is journaled in a fork 30 which has a shank 31 which passes through bearing blocks 32 fixed to the central plow beam 6 in rear of and parallel to the shank 9. On the upper end of the shank 31 is fixed a cross arm 33 provided in its ends with adjustable screws 34 adapted to engage the central cross bar 11 for the purpose hereinafter explained.

The operation of the plow is as follows: When the cross beams 2 are at an angle of 90° to the tongue 4, the wheels 13 will be directly opposite each other in the same horizontal plane, and the plow disks 8 will be in alinement. To place the parts in operative position for plowing in the direction indicated in Fig. 1, the bolt 25 is withdrawn by pressing the foot-lever 27, whereupon the cross-beams 2 are rocked on their pivots 5 until the desired width between the plow beams is attained, and the parts are again locked in position by allowing the bolt 25 to engage one of the notches 24. The forward movement of the right hand side beam 1 increases the distance between the right hand stub-shaft 15 and the lever 18, while the rearward movement of the left hand beam 1 decreases the distance between the left hand stub-shaft 15 and the left hand lever, and through the medium of the connecting rods 17 the levers 14 are rocked on their shafts 15 and the right and left hand side wheels 13 are automatically lowered and raised respectively. If the depth of the furrow is to be increased or diminished the levers 18 are shifted and locked in their shifted position by the racks and pawls 20 and 21, respectively. The brackets 19 are pivoted on the rear cross-beam to permit them to assume a position parallel to the position of the rods 17 which changes with the rocking of the cross-beams on their pivots.

The relative angle of the plow disks to the plow beams is simultaneously and automatically changed by the rocking of the beams 2 through the medium of the cross-bars 11 and the rods 12, which latter are connected to the rear beam 2 and cross bars as above described. The angularity of the plow disks depends upon the distance between the plow beams, and both the angularity and distance may be changed at will by simply rocking the cross-beams on their pivots 5.

The guide disk 29 is held parallel to the supporting wheels 13 or at an angle to the line of draft when the disks are in operative position, by means of the cross bar 33 engaging the cross bar 11 of the central disk, and when the angularity of the latter has been changed the position of the disk is maintained by adjusting the screws 34 so that they will engage the cross bar 11.

The position of the wheels, plow-beams and disks is automatically reversed, from the position shown in Fig. 1, by simply withdrawing the bolt and turning the plow to the left. As the team pulls the tongue around, the left hand wheel acts as a pivot and the right hand wheel will fall behind as the plow turns, thus causing the raising of the latter wheel, which will now travel on the unplowed ground while the left hand wheel, which is lowered, travels in the furrow. It will thus be seen that said wheels act both as land and furrow wheels alternately.

I claim—

1. The combination of a plurality of parallel plow beams movable longitudinally with relation to each other, supporting wheels connected therewith adapted to act as land and furrow wheels alternately, and means operated by the relative longitudinal movement of the beams to automatically raise and lower said wheels.

2. The combination of a plurality of parallel plow beams movable longitudinally with relation to each other, supporting wheels connected therewith, and means operated by the relative longitudinal movement of the beams to automatically raise and lower said wheels, said means capable of independent adjustment.

3. The combination of a plurality of plow beams, movable longitudinally with relation to each other, supporting wheels connected with the beams on opposite sides thereof adapted to act as land and furrow wheels alternately and means operated by the relative longitudinal movement of the beams to raise one wheel and simultaneously lower the other wheel.

4. A plow comprising two parallel plow beams, a transverse beam pivotally connected thereto, a two-armed lever fulcrumed on each plow beam, a wheel journaled on one arm of each lever adapted to act as land and furrow wheels alternately and means connecting the other arms of the two-armed levers with the transverse beam.

5. A plow comprising two parallel plow beams, a transverse beam pivotally connected thereto, a wheel support fulcrumed on and movable with each plow-beam, and mechanism pivotally connected with the transverse beam adapted to adjust the wheel supports independently of each other.

6. A plow comprising two parallel plow beams, a transverse beam pivotally connected thereto, a wheel support fulcrumed on and movable with each plow-beam, a segmental rack bracket pivoted on the transverse beam, an operating lever pivoted on each bracket, and rods connecting the wheel supports and operating levers.

7. The combination of a plurality of relatively movable plow beams, supporting wheels connected therewith, means operated by the relative movement of the beams to raise and lower the wheels, rotatable disks pivoted in the beams and means operated by the relative movement of the latter to rotate the pivots.

8. A plow comprising a plurality of parallel plow beams, transverse beams pivotally connected thereto, two-armed levers fulcrumed on the plow beams, a wheel journaled on one arm of each lever, operating levers pivoted on the transverse beams, and rods connecting the free arms of the two-armed levers with the operating levers.

9. A plow comprising a plurality of parallel plow beams, transverse beams pivotally connected thereto, two-armed levers fulcrumed on the plow beams, a wheel journaled on one arm of each lever, means connecting the other arms of the two-armed levers with the transverse beams, plow disks pivoted on the rear ends of the plow beams, a lever connected to the pivot of each disk, and a rod connecting the last named lever with one of the transverse beams.

10. A plow comprising a plurality of parallel plow beams, transverse beams pivotally connected thereto, rotatable plow disks pivoted on the plow beams, levers fixed on the pivots, rods connecting the levers and transverse beams, a guide disk pivoted on one of the plow beams, and a cross bar connected with the guide disk adapted to be engaged by one of the levers on the plow disk pivot.

11. A plow comprising a plurality of parallel plow beams, transverse beams pivotally connected thereto, rotatable plow disks pivoted on the plow beams, levers fixed on the pivots, rods connecting the levers and transverse beams, a guide disk pivoted on one of the plow beams, a cross bar connected with the guide disk adapted to be engaged by one of the levers on the plow disks, and adjustable members in the cross bar adapted to engage the levers on one of the plow disk pivots.

12. A plow comprising a main beam, parallel cross beams pivoted thereon, plow beams pivotally connected to the parallel beams, a central plow beam connected with the main beam, two-armed levers fulcrumed on the side plow beams, a wheel journaled on one arm of each lever, segmental rack brackets pivoted on one of the parallel beams, an operating lever pivoted on each bracket, rods connecting the free arms of the two-armed levers and the operating levers, plow disks pivoted on the rear ends of the plow beams, cross bars fixed on the pivots, cross rods connecting the cross bars with the parallel beams, means to lock the latter in different positions relative to the main beam, a guide disk pivoted on the central plow beam, and a cross bar on the pivot of the guide disk adapted to be engaged by the cross bar on the central plow disk pivot.

In testimony that I claim the foregoing as my invention, I have signed my name in presence of two subscribing witnesses.

AUGUSTA P. McKAY.

Witnesses:
GEORGE L. HOXIE,
W. E. SANFORD.

---

Copies of this patent may be obtained for five cents each, by addressing the "Commissioner of Patents, Washington, D. C."